US006967818B2

(12) United States Patent
Baumgart et al.

(10) Patent No.: US 6,967,818 B2
(45) Date of Patent: Nov. 22, 2005

(54) DISK DRIVE HEAD WITH RADIALLY SPACED READ AND WRITE ELEMENTS ON RESPECTIVE PROTRUSION PADS

(75) Inventors: Peter Michael Baumgart, San Jose, CA (US); Bernhard E. Knigge, San Jose, CA (US); Robert N. Payne, San Jose, CA (US); Gurinder Pal Singh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 172 days.

(21) Appl. No.: 10/620,634

(22) Filed: Jul. 16, 2003

(65) Prior Publication Data

US 2005/0013040 A1 Jan. 20, 2005

(51) Int. Cl.$^7$ .............................. G11B 5/60; G11B 17/02
(52) U.S. Cl. ................ 360/234.7; 360/97.02; 360/235.7; 360/236.5
(58) Field of Search .............. 360/234.7–234, 360/235.7, 236.5, 97.02, 97.03, 234.8, 234.9, 122

(56) References Cited

U.S. PATENT DOCUMENTS

| | | | | |
|---|---|---|---|---|
| 6,643,093 B2 | * | 11/2003 | Brown et al. | 360/97.02 |
| 6,714,382 B1 | * | 3/2004 | Alexopoulos et al. | 360/235.8 |
| 6,762,909 B2 | * | 7/2004 | Albrecht et al. | 360/97.02 |
| 2002/0075593 A1 | * | 6/2002 | Ultican et al. | 360/122 |

OTHER PUBLICATIONS

Patent Application: "Magnetic Recording Disk Drive With Self–Limiting Wearable Contact Pad Air–Bearing Slider in Hermetically Sealed Environment", Albrecht et al. Filed Aug. 2, 2002, U.S. App. No. 10/212,575.

* cited by examiner

Primary Examiner—Robert S. Tupper
(74) Attorney, Agent, or Firm—John L. Rogitz

(57) ABSTRACT

The head of a disk drive has write elements disposed on one protrusion pad that wears away during initial operation to permit reduced tolerances and, thus, reduced spacing between the disk and head, with the read element being disposed on a separate protrusion pad and spaced from the write element pad in the radial dimension. This prevents read element recession during cooling in the absence of write current that could otherwise occur if the read element were located on the same pad as the write head.

24 Claims, 2 Drawing Sheets

_US 6,967,818 B2_

DISK DRIVE HEAD WITH RADIALLY SPACED READ AND WRITE ELEMENTS ON RESPECTIVE PROTRUSION PADS

FIELD OF THE INVENTION

The present invention relates generally to magnetic recording disk drives.

BACKGROUND OF THE INVENTION

Magnetic recording disk drives store digital data in the magnetic recording medium of a rotating storage disk. The disks can be coated with a magnetizable medium and mounted on the hub of a spindle motor for rotation at high speed. Data is stored as magnetic transitions on the disks in a plurality of concentric circular data tracks. The data is recorded and read by a read/write transducer or head. Each read/write head is located on the trailing end of an air-bearing slider, with the air-bearing surface (ABS) of the slider supporting the slider above the rotating disk. Each slider is mounted on the end of an arm of a rotary actuator that moves the sliders and attached heads across the disk surfaces. The write head can be an inductive write head with the magnetic elements being the magnetic poles that generate the magnetic write fields. The read head can be a magnetoresistive (MR) read head, which may be a spin-valve type giant magnetoresistance (GMR) sensing element, or the more recently proposed magnetic tunnel junction (MTJ) sensing element.

An important parameter affecting the recording density of a disk drive is the magnetic spacing between the magnetic elements (the write poles and the read element) and the magnetizable medium of the disk. Closer physical spacing (leading to closer magnetic spacing) allows for smaller magnetic "bits", which in turn allow for narrower track widths and consequently a greater recording density.

The magnetic spacing on a storage disk can be limited to a certain extent by the thickness of a protective overcoat that is applied on the magnetic elements to inhibit corrosion. The spacing can also be limited by how far the read head elements are recessed from the air bearing surface of the slider, and by tolerances that must be built into the flying height of the slider to accommodate manufacturing and assembly.

A self-limiting wear contact pad (or "protrusion pad") on an air bearing slider has been introduced to reduce the limitations noted above by reducing the built-in tolerances associated with slider fabrication and disk drive mechanical assembly, and by eliminating head overcoats and some head recession. In protrusion pad disk drives, the heads of the disk drive are encapsulated in a pad that protrudes towards the disk beyond the air bearing surface of the rest of the slider. The protrusion pad is designed so that it initially contacts the disk. The contact force between the pad and the disk depends on the extent of protrusion of the pad. The head overcoat and rest of the protrusion pad are relatively quickly "burnished" or worn away during contact with the rotating disk. The wear stops when the head no more contacts the disk with sufficient contact force. Thus, the wear is self limiting. The amount of pad to be burnished is designed such that the protective overcoat on the pad and most of the recession of the magnetic elements is eliminated. This leaves only a very small distance between the head and disk across the air bearing surface and, thus, permitting the use of smaller magnetic bits and, hence, denser recording. Protrusion pads are described in the present assignee's pending U.S. patent application entitled "Self-Limiting Wear Contact Pad Slider and Method for Making Same", Ser. No. 09/681,234 filed Oct. 13, 2000, which is incorporated herein by reference. Additionally, to alleviate the risk of corrosion that arises when the head overcoat is worn away, vapor phase corrosion inhibitors (VPCI) to prevent corrosion of uncoated heads have been proposed in the present assignee's pending U.S. patent application entitled "Magnetic Recording Device with Improved Reliability", Ser. No. 10/051,866 filed Jan. 15, 2002, which is incorporated herein by reference. As an alternative to VPCI, the present assignee's co-pending U.S. patent application Ser. No. 10/212,575, filed Aug. 2, 2002 and incorporated herein by reference, sets forth a way to hermetically seal a disk drive.

The present invention makes the critical observation that while protrusion pad-based heads are indeed effective in achieving greater data densities, it happens that during writing, current through the coil and the fluctuating magnetic flux through the yoke of the write element produces heat, causing the materials in the heated region to expand and protrude toward the disk. Although the protruding portions wear away in accordance with protrusion pad principles discussed above, subsequent to burnishing and when no write current is applied, the materials cool and retract away from the disk. Because the read head is mounted on the same protrusion pad as the write poles, it, too, retracts away from the disk during such periods, increasing the head-to-disk spacing during read operation and, thus, limiting the data density that can be achieved.

The present invention further understands that simply increasing the distance between the read head and write poles on the protrusion pad is less than optimum, because it requires a larger protrusion pad that burnishes more slowly than a smaller pad, owing to its size, and furthermore that can result in unintended lift of the head away from the disk, again owing to a relatively large surface area. This lift can impose undue constraints on the air bearing design. Having made the above critical observations, the invention disclosed herein has been provided.

SUMMARY OF THE INVENTION

A magnetic recording disk drive includes a rotatable magnetic recording disk and a head assembly that has a write element for writing data to the disk and a read element for reading data from the disk. The write element is covered by a first protective pad that wears away when in contact with the rotating disk, and the read element is covered by a second protective pad that wears away when in contact with the rotating disk. A slider supports the pads and has a gas-bearing surface for maintaining the slider near the surface of the disk when the disk is rotating. The protective pads extend beyond the gas-bearing surface of the slider until burnished away. An actuator is connected to the slider for moving the slider across the surface of the disk, and a housing surrounds the disk and slider.

In one preferred embodiment, the housing is hermetically sealed to provide a gaseous environment that is non-corrosive to the elements after the protective overcoat has been worn away. In another embodiment, the housing contains vapor phase corrosion inhibitors (VPCI) to alleviate the risk of corrosion to the elements. In a third embodiment sufficiently large amount of desiccant is provided that keeps the partial pressure of the corrosion causing vapors such as $H_2O$ below a threshold level for the life of the disk drive.

As set forth further below, the actuator arm defines a y-dimension, and the pads can be spaced from each other in the y-dimension. The pads may be separated from each other by at least fifty (50) microns. If desired, a third element can be provided on a respective third protruding pad for redundancy.

In one illustrative non-limiting embodiment, the read head includes an insulating region, and the protruding pads extend partly in and partly beyond the insulating region, onto the slider. In another non-limiting embodiment, the pads are disposed entirely within the insulating region.

In another aspect, a head structure for a magnetic disk drive includes a read element and a first protruding pad closely surrounding the read element. The first protruding pad is burnishable until such time as the first pad has been burnished by cooperation between the first pad and a disk rotating beneath the first pad. A write element may also be provided, and a second protective pad closely surrounds the write element. Like the first pad, the second protective pad is burnishable until such time as the second pad has been burnished by cooperation between the second pad and the disk. The pads are spaced from each other on a slider member.

In still another aspect, a disk drive includes a rotatable magnetic recording disk and a head assembly that has a means for writing data to the disk that is covered by a first burnishable means, such as a pad. A means for reading data from the disk is also in the head, with the means for reading being covered by a second burnishable means. The first and second burnishable means are spaced from each other by a distance that is sufficient to substantially prevent the second means from being heated when the means for writing is activated.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
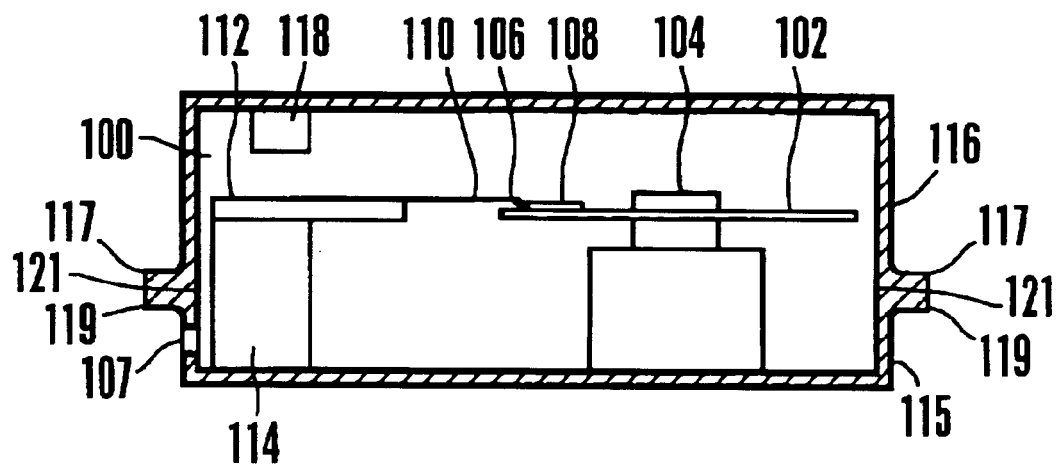
FIG. 1 is a schematic side view in partial cross-section of a disk drive incorporating the present head structure.
Figure 2:
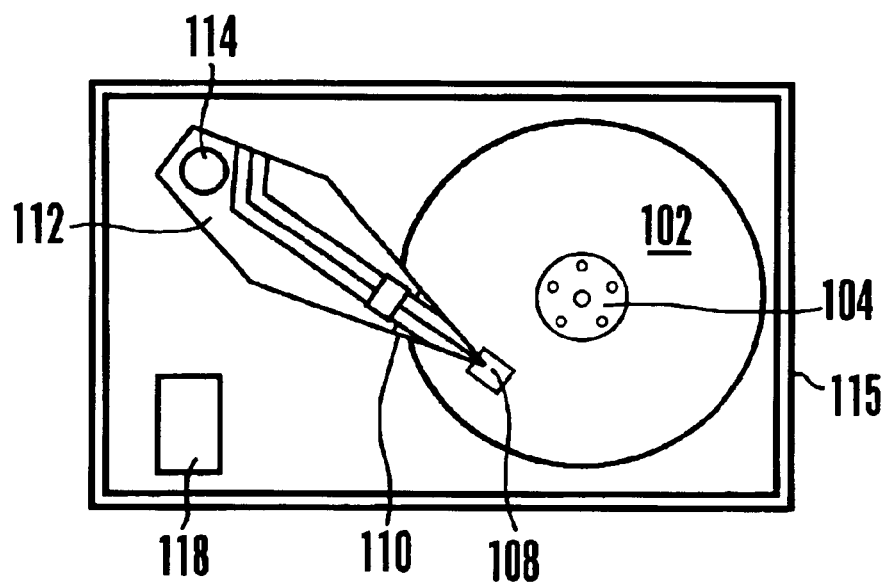
FIG. 2 is a schematic plan view the disk drive shown in FIG. 1.

Referring initially to FIGS. 1 and 2, a disk drive is shown, generally designated 100, that includes a magnetic recording disk 102 including a substrate of glass, AlMg alloys or ceramic, a metallic magnetic layer, a protective overcoat typically formed of amorphous "diamond-like" carbon, and a lubricant layer. The hard disk drive 100 further includes a read/write head assembly 106 that is more fully discussed below in reference to FIG. 3. The read/write elements of the assembly 106 may include an MR read element and an inductive write head element with pole tips. As shown, the assembly 106 is formed on the trailing end of an air-bearing slider 108 for magnetically reading and writing data in the magnetic layer of the disk 102. If desired, the magnetic elements of the head assembly 106 and the magnetic recording disk 102 can be coated with a thin essentially amorphous carbon such as so-called "diamond like" carbon, which establishes an overcoat of about 1 nm to 10 nm thickness.

The slider 108 may be made of one or more materials, such as alumina (Al2O3) or TiC—$Al_2O_3$ composite, or silicon.

In accordance with disk drive principles, the magnetic recording disk 102 is rotated relative to the slider 108 by a drive motor 104. The preferred slider 108 is a self-limiting wear protrusion pad slider that is connected to a suspension 110 which in turn is connected to an actuator 114 by means of a rigid arm 112. An example of such a slider (with integral protrusion pads that burnish or wear down during the initial operational stage) is set forth in the above-incorporated U.S. patent application Ser. No. 09/681,234.

It is to be understood that while only a single head assembly and disk are shown in FIGS. 1 and 2 for clarity, the present disk drive may contain multiple disks with respective head assemblies.

In one embodiment, the disk drive structure is enclosed in a hermetically sealed housing that is established by a base plate 115 and a cover 116. By "hermetically sealed" is meant that the seal is so tight that the disk drive's internal pressure is substantially independent of the external or ambient pressure, in contrast to a conventional or non-hermetically sealed disk drive that has a breather port with filter in a wall of the base plate or cover for equalizing the disk drive's internal pressure with the external pressure. It is also preferred that the hermetic seal have very low permeability to water. An example of a hermetically sealed housing is set forth in the above-incorporated U.S. patent application Ser. No. 10/212,575. By way of non-limiting example, the disk drive 100 can be hermetically sealed at flanges 119, 117 of the base plate 115 and top cover 116, respectively, by, e.g., a butt weld joint 121, to protect against the corrosion of the below-discussed magnetic elements, which preferably do not have a carbon overcoat to minimize magnetic spacing during operation.

Alternatively or in addition to hermetically sealing the housing, a desiccant, humidity buffer, or vapor phase corrosion inhibitor (VPCI) package 118 can be provided in the housing to prevent corrosion of uncoated heads. Such a VPCI arrangement is set forth in the above-incorporated U.S. patent application Ser. No. 10/051,866. As yet another alternative, a large amount of desiccant material can be provided in the drive.

Figure 3:
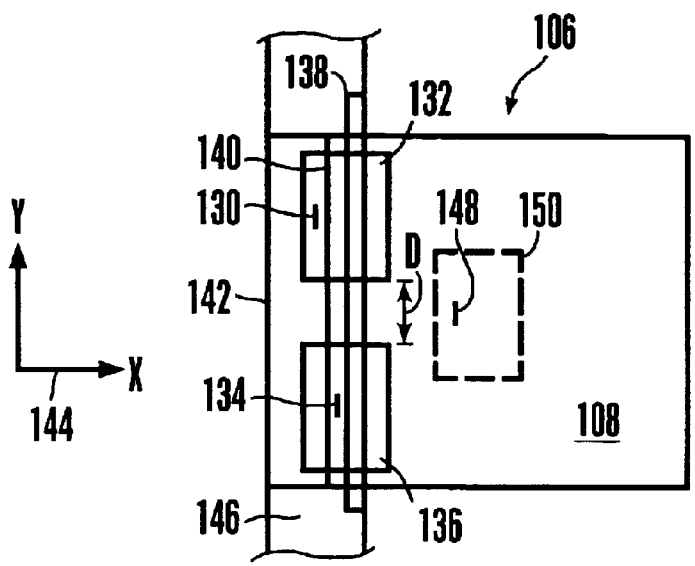
FIG. 3 is a schematic view of the present head structure.
Figure 4:
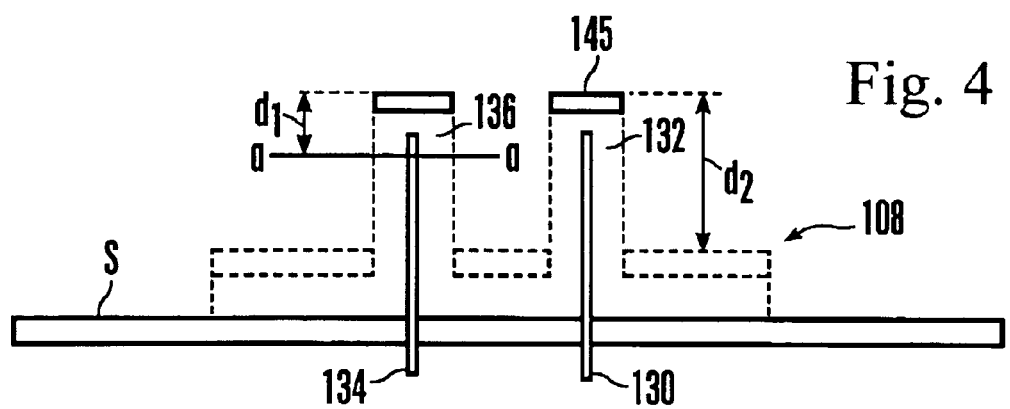
FIG. 4 is a side elevational view of the head structure shown in FIG. 3.

Now referring to FIGS. 3 and 4, details of the head assembly 106 can be seen. At least one write element 130 is shown for writing data to the disk, with the write element 130 being encapsulated by and juxtaposed with a first protrusion pad 132 that wears away in accordance with protrusion pad principles set forth in the above-referenced '234 application. Also, a read element 134 is provided for reading data from the disk, and the read element 134 is covered by and juxtaposed with a second protrusion pad 136. Shields 138, 140 can straddle the read element 134 as shown in FIG. 3, with the preferred write element 130 not being straddled by the shields 138, 140, but closely spaced therefrom. The elements 130, 134 can be conventionally wired to read and write circuits in accordance with principles known in the art.

As set forth in the '234 application, the protrusion pads are formed out of the same material as the slider 108 near the trailing edge 142 (FIG. 3) of the assembly 108. That is, as shown in FIG. 3, the edge 142 is the trailing edge vis-a-vis the direction of relative motion of the head assembly 108 over the disk 102. As shown by the axes 144, the direction defined by the edge 142 is the y-dimension, with the x-dimension being orthogonal thereto. When the angular position of the arm is such that the disk motion is tangential to the x-dimension, the y-axis coincides with the radial dimension of the disk. The two protrusion pads are separated largely along the y-dimension.

In any case, the slider 108 supports the pads 132, 136 and has a gas-bearing surface for maintaining the slider 108 near the surface of the disk when the disk is rotating, with the protrusion pads 132, 136 extending beyond the gas-bearing surface of the slider as best shown in FIG. 4 until burnished away. More specifically, during an initial reduced-RPM (or reduced atmospheric pressure) wear-in, the disk 102 is rotated with the protrusion pads 132, 136 in contact therewith so that the overcoat wears away and the pads wear down by rubbing on the disk 102 until the interference between the pads and disk is zero. Besides low RPM or reduced atmospheric pressure other means may be employed to increase the contact force between the protruding pad and disk to facilitate burnishing. At normal full-RPM operation, a very small clearance exists between the end of the protrusion pads 132, 136 and the disk 102 surface, which assures reliability of the head-disk interface.

For convenience, to summarize the above-referenced '575 application with respect to how the pads 132, 136 can be formed in one non-limiting embodiment, as best shown in FIG. 4 a flat polished surface of the slider 108 is patterned so that an air bearing surface (ABS) is created by a removal process such as etching or ion milling. The ABS is the top most polished surface and pressurizes with air from the rotating disk to lift the slider and support it above the disk. The trailing edge 142 shown in FIG. 3 is formed using a dual etch design with three surface levels. A third etch is then performed to produce a fourth surface level. The depth of the third etch produces the protrusion pad 132, 136 that are designed to have heights that are greater than or equal to the fly height of the slider. The pads 132, 136 (as well as, if desired, the ABS and deeper etched slider surface "S" shown in FIG. 4) may have an outer thin carbon overcoat 145 that wears away when it comes into contact with the rotating disk surface. It should be noted that the ABS of the slider 108 is a polished surface before the protrusion pads are formed (by, e.g., ion milling). After pad formation the roughness of the ABS may increase somewhat and can be more than that of a polished surface.

The preferred pads 132, 136 are small enough that they do not provide any significant air-bearing effect to the slider 108. They are also small enough so that the pads will wear quickly and easily and will not affect the fly height as they wear down.

FIGS. 3 and 4 show particular dimensions that can be established in a preferred embodiment. As shown in FIG. 3, the pads 132, 136 can be spaced from each other by a distance "D" (FIG. 3) that is sufficient to substantially prevent the read element pad 136 from being heated when the write element 130 is activated by sending write current through it. Preferably, the pads are separated from each other by at least fifty (50) microns. Moreover, in the preferred embodiment shown, the pads 132, 136 are spaced from each other in the y-dimension. Also, as shown in FIG. 4 the top of the elements 130, 134 may be spaced from the top of their respective protrusion pads 132, 136 by a recession $d_1$, while the distance $d_2$ shown in FIG. 4 (typically in the range of 10 nm–30 nm) represents the distance from the top of the ABS to the top of the protrusion pads 132, 136 (prior to wearing away). The line a-a in FIG. 4 represents the height to which the pads 132, 136 should be burnished to remove the entire thickness of the overcoat 145 and to wear the pads away down the entire recession $d_1$.

Returning to FIG. 3, an insulating region 146 may be provided at the trailing end 142 in accordance with principles known in the art. When the slider 108 is made of Titanium ceramic, the insulating region 146 may be made of sputtered alumina. When the slider 108 is made of silicon, the insulating region could be made of silicon dioxide. In any case, in the embodiment shown in FIG. 3 the pads 132, 136 lie partially on the slider 108 and partially on the insulating region 146.

Completing the description of FIG. 3, if desired a third read or write element 148 can be provided on an optional third protruding pad 150 that is spaced from the first two pads 132, 136 in the x and/or y dimensions and that is otherwise substantially identical in configuration and operation to the pads 132, 136. The extra element 148 provides redundancy in case of, e.g., failure of an element 130, 134 during manufacture. Or, the element 148 can be a resistive element, the resistance of which can be used as a monitor for the burnishing process, and the third pad 150 can surround it.

Figure 5:
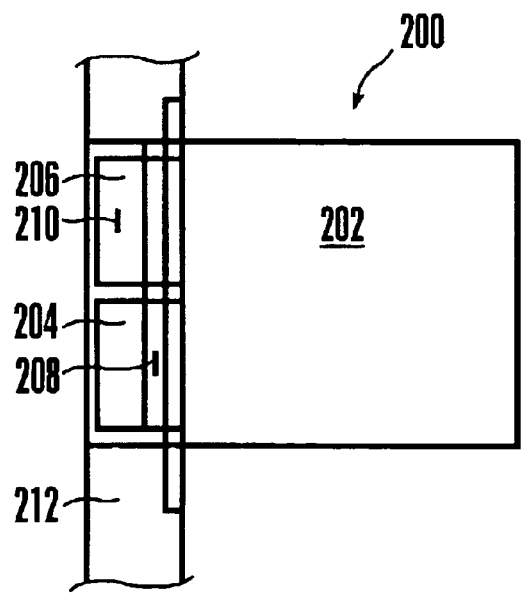
FIG. 5 is a schematic view of an alternate head structure.

FIG. 5 shows a head assembly 200 having a slider 202 supporting protruding pads 204, 206 that surround read and write elements 208, 210. An insulating region 212 is provided at the trailing edge of the slider 202. The assembly 200 shown in FIG. 5 is in all essential respects identical to the assembly 108 shown in FIG. 3, except that the pads 204, 206 are disposed entirely within the insulating region 212.

While the particular DISK DRIVE HEAD WITH RADIALLY SPACED READ AND WRITE ELEMENTS ON RESPECTIVE PROTRUSION PADS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We Claim:

1. A magnetic recording disk drive comprising:
   a rotatable magnetic recording disk;
   a head assembly having:
   at least one write element for writing data to the disk, the write element being encapsulated by a first protrusion pad that wears away when in contact with the rotating disk; and at least one read element for reading data from the disk, the read element being encapsulated by a second protrusion pad that wears away when in contact with the rotating disk;

a slider supporting the pads and having a gas-bearing surface for maintaining the slider near the surface of the disk when the disk is rotating, wherein the protrusion pads extend beyond the gas-bearing surface of the slider until burnished away;

an actuator connected to the slider for moving the slider across the surface of the disk; and a housing surrounding the disk and slider.

2. The disk drive of claim 1, wherein the housing is hermetically sealed to provide a gaseous environment that is non-corrosive to the elements after the protective pad has been worn away.

3. The disk drive of claim 1, wherein the housing contains vapor phase corrosion inhibitors (VPCI) to alleviate the risk of corrosion to the elements.

4. The disk drive of claim 1, wherein a y-dimension is established vis-à-vis disk motion under the slider, and the pads are spaced from each other in the y-dimension.

5. The disk drive of claim 1, wherein the pads are separated from each other by at least fifty (50) microns.

6. The disk drive of claim 1, further comprising a third element on a respective third protrusion pad.

7. The disk drive of claim 1, wherein the head assembly includes at least one insulating region, at least one pad extending partly in and partly beyond the insulating region.

8. The disk drive of claim 1, wherein the head assembly includes at least one insulating region, at least one pad being disposed entirely within the insulating region.

9. A head structure for a magnetic disk drive, comprising:

at least one read element;

a first protrusion pad closely and completely surrounding the read element, the first protrusion pad being at least burnishable until such time as the first pad has been burnished by cooperation between the first pad and at least one disk rotating beneath the first pad;

at least one write element; and a second protrusion pad closely and completely surrounding the write element, the second protrusion pad being at least burnishable until such time as the second pad has been burnished by cooperation between the second pad and at least one disk rotating beneath the second pad;

wherein the pads are spaced from each other on a slider member.

10. The structure of claim 9, wherein the pads are spaced from each other by at least fifty (50) microns.

11. The structure of claim 9, wherein the disk drive defines a y-dimension, and the pads are spaced from each other in the y-dimension.

12. The structure of claim 9, further comprising a third element on a respective third protective pad.

13. The structure of claim 9, wherein the structure is disposed in a hermetically sealed housing to provide a gaseous environment that is non-corrosive to the elements.

14. The structure of claim 9, wherein the structure is disposed in a housing containing vapor phase corrosion inhibitors (VPCI) to alleviate the risk of corrosion to the elements.

15. The structure of claim 9, wherein the structure is disposed in a housing containing sufficient amount of desiccant material to sufficiently reduce the partial pressure of the corrosion causing vapors in the disk drive.

16. A head structure for a magnetic disk drive, comprising:

at least one read element;

a first protrusion pad closely surrounding the read element, the first protrusion pad being at least burnishable until such time as the first pad has been burnished by cooperation between the first pad and at least one disk rotating beneath the first pad;

at least one write element; and a second protrusion pad closely surrounding the write element, the second protrusion pad being at least burnishable until such time as the second pad has been burnished by cooperation between the second pad and at least one disk rotating beneath the second pad;

wherein the pads are spaced from each other on a slider member, and at least one insulating region, at least one pad extending partly in and partly beyond the insulating region.

17. A head structure for a magnetic disk drive, comprising:

at least one read element;

a first protrusion pad closely surrounding the read element, the first protrusion pad being at least burnishable until such time as the first pad has been burnished by cooperation between the first pad and at least one disk rotating beneath the first pad;

at least one write element; and a second protrusion pad closely surrounding the write element, the second protrusion pad being at least burnishable until such time as the second pad has been burnished by cooperation between the second pad and at least one disk rotating beneath the second pad;

wherein the pads are spaced from each other on a slider member, and at least one insulating region, at least one pad being disposed entirely within the insulating region.

18. A disk drive, comprising:

a rotatable magnetic recording disk; and a head assembly having:

at least one means for writing data to the disk, the means for writing being covered by a first burnishable means; and at least one means for reading data from the disk, the means for reading being covered by a second burnishable means, the first and second burnishable means being spaced from each other by a distance sufficient to substantially prevent the second means from being heated when the means for writing is activated.

19. The disk drive of claim 18, further comprising:

a slider supporting the burnishable means and having a gas-bearing surface for maintaining the slider near the surface of the disk when the disk is rotating, wherein the burnishable means extend beyond the gas-bearing surface of the slider until burnished away;

an actuator connected to the slider for moving the slider across the surface of the disk; and a housing surrounding the disk and slider.

20. The disk drive of claim 19, wherein the housing is hermetically sealed to provide a gaseous environment that is non-corrosive to the means for writing and means for reading after the burnishable means have been worn away.

21. The disk drive of claim 19, wherein the housing contains vapor phase corrosion inhibitors (VPCI) to alleviate the risk of corrosion to the means for writing and means for reading.

22. The disk drive of claim 18, wherein the disk defines a y-dimension, and the burnishable means are spaced from each other in the y-dimension.

23. The disk drive of claim 18, wherein the burnishable means are separated from each other by at least fifty (50) microns.

24. The disk drive of claim 18, further comprising a third means for at least one of: reading, and writing, on a respective third burnishable means.

* * * * *